(12) United States Patent
Dosenbach et al.

(10) Patent No.: US 9,789,922 B2
(45) Date of Patent: Oct. 17, 2017

(54) MODIFIED DOOR OPENING OF A MOTORIZED VEHICLE FOR ACCOMMODATING A RAMP SYSTEM AND METHOD THEREOF

(71) Applicant: The Braun Corporation, Winamac, IN (US)

(72) Inventors: Eric Sajed Dosenbach, Winamac, IN (US); Timothy S. Barber, Logansport, IN (US); Michael Pugh, Winamac, IN (US)

(73) Assignee: The Braun Corporation, Winamac, IN (US)

(*) Notice: Subject to any disclaimer, the term of this patent is extended or adjusted under 35 U.S.C. 154(b) by 258 days.

(21) Appl. No.: 14/574,739

(22) Filed: Dec. 18, 2014

(65) Prior Publication Data

US 2016/0176459 A1 Jun. 23, 2016

(51) Int. Cl.
*B62D 65/00* (2006.01)
*A61G 3/06* (2006.01)
*B62D 25/04* (2006.01)

(52) U.S. Cl.
CPC .............. *B62D 65/00* (2013.01); *A61G 3/061* (2013.01); *B62D 25/04* (2013.01); *A61G 2220/14* (2013.01)

(58) Field of Classification Search
CPC ........ B62D 65/00; B62D 65/06; B62D 25/04; B62D 65/02; A61G 3/061; A61G 3/02;

(Continued)

(56) References Cited

U.S. PATENT DOCUMENTS 3,275,370 A 9/1966 Smith
4,114,318 A 9/1978 Brindle
(Continued)

FOREIGN PATENT DOCUMENTS

CA 2873123 A1 12/2013
EP 2261449 B1 8/2012
(Continued)

OTHER PUBLICATIONS

International Search Report and Written Opinion of the International Searching Authority in International Application No. PCT/US2016/018020, dated May 12, 2016, 11 pages.

*Primary Examiner* — Glenn Myers
(74) *Attorney, Agent, or Firm* — Taft Stettinius & Hollister LLP; Stephen F. Rost

(57) ABSTRACT

A method of increasing a door opening width of a crossover vehicle to accommodate a wheelchair ramp or lift assembly. The method includes positioning a template on a B pillar and a template on a C pillar and marking cut lines on the pillars. The method includes cutting along the cut lines with a cutting tool to remove portions of the B pillar and the C pillar. A B pillar cover assembly is assembled and a reinforcement plate is coupled to a remaining portion of the C pillar. An adhesive is applied to the B pillar cover assembly and to a C pillar cap. A modified B pillar is produced by coupling the B pillar cover assembly to a remaining portion of the B pillar, and a modified C pillar is produced by coupling the C pillar cap to the reinforcement plate and the remaining portion of the C pillar.

11 Claims, 13 Drawing Sheets

(58) Field of Classification Search
CPC .......... A61G 3/06; A61G 3/067; A61G 3/062;
A61G 3/063; A61G 3/0808; A61G
2220/14; A61G 2220/16; B60P 1/43;
B60P 1/44
See application file for complete search history.

(56) References Cited

U.S. PATENT DOCUMENTS

| | | | |
|---|---|---|---|
| 4,664,584 A | | 5/1987 | Braun et al. |
| 5,180,275 A | | 1/1993 | Czech et al. |
| 5,380,144 A | * | 1/1995 | Smith .................... A61G 3/061 |
| | | | 14/71.3 |
| 6,793,269 B2 | | 9/2004 | Pugh et al. |
| 6,860,543 B2 | | 3/2005 | George et al. |
| 7,364,219 B2 | | 4/2008 | Lowson et al. |
| 7,816,878 B2 | | 10/2010 | Heigl et al. |
| 7,934,290 B2 | | 5/2011 | Gherardi et al. |
| 8,807,575 B2 | | 8/2014 | Bartel et al. |
| 8,998,558 B2 | * | 4/2015 | Kitchin .................... A61G 3/06 |
| | | | 280/6.152 |
| 9,476,246 B2 | | 10/2016 | Fairchild |
| 2006/0267375 A1 | | 11/2006 | Enomoto |
| 2007/0059136 A1 | * | 3/2007 | Schlangen ............ B60P 1/4421 |
| | | | 414/467 |
| 2007/0062118 A1 | | 3/2007 | Lindemann et al. |
| 2009/0072583 A1 | | 3/2009 | Elliot et al. |
| 2010/0289299 A1 | | 11/2010 | Kitayama |
| 2010/0295337 A1 | | 11/2010 | Elliot et al. |
| 2014/0248109 A1 | | 9/2014 | Johnson et al. |
| 2014/0356118 A1 | | 12/2014 | Friedlinghaus et al. |
| 2015/0173984 A1 | * | 6/2015 | Kitchin .................... A61G 3/06 |
| | | | 414/544 |
| 2016/0074261 A1 | * | 3/2016 | Schoenian ............ A61G 3/062 |
| | | | 414/462 |

FOREIGN PATENT DOCUMENTS

WO      2007046793 A1      4/2007
WO      2011037989 A2      3/2011

* cited by examiner

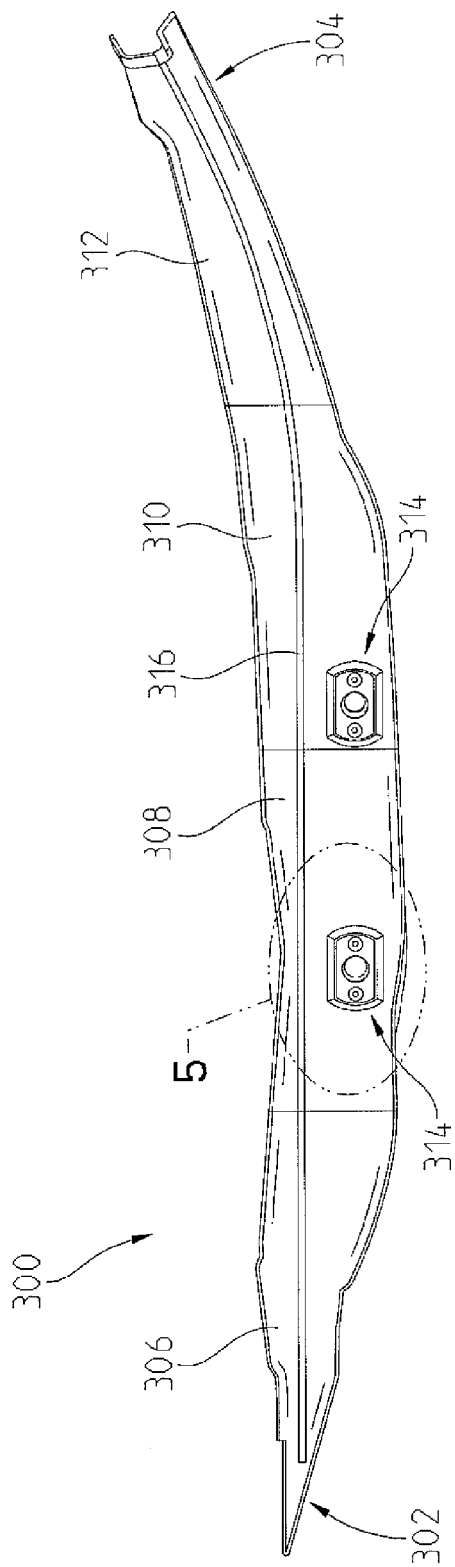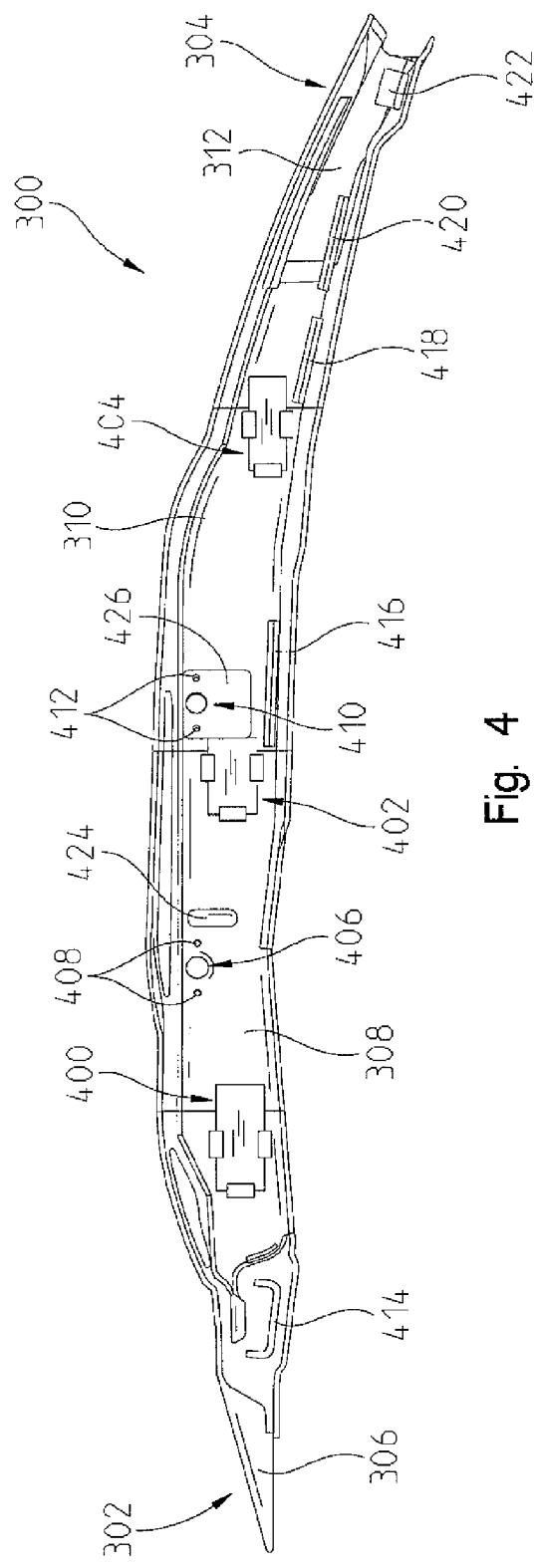
Fig. 3
Fig. 4

MODIFIED DOOR OPENING OF A MOTORIZED VEHICLE FOR ACCOMMODATING A RAMP SYSTEM AND METHOD THEREOF

FIELD OF THE DISCLOSURE

The present disclosure relates to a motorized vehicle for transporting one or more passengers, and more particularly to a motorized vehicle which is retrofitted for transporting one or more physically limited passengers seated in a wheelchair.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example in one configuration, a van may be retrofitted with a ramp to enable a physically limited individual using a wheelchair to enter the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry of the physically limited individual through what is known as the assisted entrance. Once inside the van, individuals who use the assisted entrance are often located in a rear passenger compartment of the van adjacent to or behind the assisted entrance.

Most, if not all, motorized vehicles modified to include a ramp or lift for transporting physically limited passengers are passenger vans or buses. Minivans, or passenger vans, are often referred to as multi-purpose vehicles (MPV's), people movers, or multi-utility vehicles. At least in the United States, minivans are classified as light trucks. In other words, most minivans or passenger vans are designed on a truck chassis. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles.

SUMMARY

In one embodiment of the present disclosure, a method is provided for increasing a width of a door opening of a crossover vehicle to accommodate a wheelchair ramp assembly or lift assembly. The vehicle includes a body frame formed partially by at least an A pillar, a B pillar, and a C pillar, where the door opening is defined between the B pillar and the C pillar. The method includes providing a first template corresponding to the B pillar and a second template corresponding to the C pillar; positioning the first template on the B pillar and the second template on the C pillar; marking a first cut line with the first template on the B pillar and a second cut line with the second template on the C pillar; cutting along the first cut line with a cutting tool to remove a portion of the B pillar; cutting along the second cut line with the cutting tool to remove a portion of the C pillar; assembling a B pillar cover assembly; coupling a reinforcement plate to a remaining portion of the C pillar; applying an adhesive to the B pillar cover assembly and to a C pillar cap; producing a modified B pillar by coupling the B pillar cover assembly to a remaining portion of the B pillar; producing a modified C pillar by coupling the C pillar cap to the reinforcement plate and the remaining portion of the C pillar; and increasing the width of the door opening between the B pillar and C pillar to enable the crossover vehicle to accommodate a ramp assembly or lift assembly.

In one example of this embodiment, the method also includes providing a plurality of elongated members; and coupling the plurality of members to form the B pillar cover assembly. In another example, the coupling a plurality of members step includes slidably engaging a tab on a first member of the plurality of members with a sleeve on a second member of the plurality of members. In a third example, the coupling a plurality of members includes positioning each of the plurality of members in contact with the remaining portion of the B pillar so that a protruding body formed on an inner surface of each member abuts an inner surface of the remaining portion of the B pillar. In a fourth example, the coupling a plurality of members includes a tongue-and-groove connection.

In a fifth example of this embodiment, the method includes drilling and tapping a plurality of holes in the B pillar cover assembly; and fastening the B pillar cover assembly to the remaining portion of the B pillar via fasteners. In a sixth example, the method may also include assembling a body to the B pillar cover assembly, the body including a cavity or through-hole configured to receive a door. In a seventh example, the increasing the width of the door opening includes increasing the width by at least three inches. In an eighth example, the method may further include clamping the B pillar cover assembly to the remaining portion of the B pillar; triggering a waiting period; and allowing the adhesive to dry between the B pillar cover assembly and the remaining portion of the B pillar until the waiting period expires. In a ninth example, the coupling a reinforcement plate includes tack welding the reinforcement plate to the remaining portion of the C pillar. In a tenth example, the method may include aligning a planar surface of the C pillar cap with a planar surface of the reinforcement plate or the remaining portion of the C pillar; and aligning a curved surface of the C pillar cap with a curved surface of the remaining portion of the C pillar.

In another embodiment of this disclosure, a crossover vehicle for transporting a wheelchair-occupied passenger includes a body frame mounted on a chassis, where the chassis is adapted to support a vehicle powertrain and a plurality of wheels; a plurality of pillars forming part of the body frame, the plurality of pillars including at least a first pillar, a second pillar, and a third pillar, where the first pillar is disposed near a front end of the vehicle and the third pillar is disposed near a rear end thereof; a plurality of doors coupled to the body frame and providing access to an interior of the vehicle; a vehicle floor coupled to the body frame and chassis; a ramp assembly coupled to the vehicle floor, the ramp assembly being configurable in at least a stowed position and a deployed position to enable the wheelchair-occupied passenger ingress and egress to and from the interior; wherein, the vehicle has a gross vehicle weight rating between approximately 6000-10000 pounds.

In one example of this embodiment, the first pillar includes a first pillar cover assembly, the first pillar cover assembly including at least a first member and a second member. In a second example, the first member comprises a tab extending from one end thereof; and the second member comprises a sleeve for receiving the tab in an assembled configuration. In a third example, the first pillar cover assembly is coupled to the first pillar via a first coupling mechanism and a second coupling mechanism, the first coupling mechanism and the second coupling mechanism including an adhesive and a plurality of mechanical fasteners. In a fourth example, the second pillar comprises a plate and a cap, the plate and cap both having a cross-section similar to a cross-section of the second pillar. In a fifth example, the plate is tack welded to the second pillar and the cap is coupled to the plate and second pillar via an adhesive.

In a different embodiment of the present disclosure, a motorized vehicle includes a frame supported by a plurality of wheels, the frame including a front end and a rear end; a door coupled to the frame and providing access to an interior of the vehicle through an opening; a plurality of pillars formed by the frame, the plurality of pillars including at least a first pillar and a second pillar, where the opening includes a width defined at least partially between the first and second pillars; wherein, the first pillar comprises a modified first pillar having a reduced width, the modified first pillar including a first cover assembly coupled to the first pillar; further wherein, the second pillar comprises a modified second pillar having a reduced width, the modified second pillar including at least a reinforcement plate and a cap.

In one example of this embodiment, the first cover assembly comprises a plurality of elongated members each having a length less than about 18 inches, each of the plurality of elongated members having one or more protrusions on an inner surface thereof for abutting against an inner wall of the modified first pillar. In a second example, the reinforcement plate and cap each include a cross-section similar to a cross-section of the modified second pillar; and the reinforcement plate is tack welded to the modified second pillar, and the cap is coupled to the reinforcement plate and the modified second pillar via an adhesive.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 illustrates an elevational side view of one side of a B pillar cover assembly;

FIG. 4 illustrates an elevational side vide of another side of the assembled B pillar structure of FIG. 3;

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
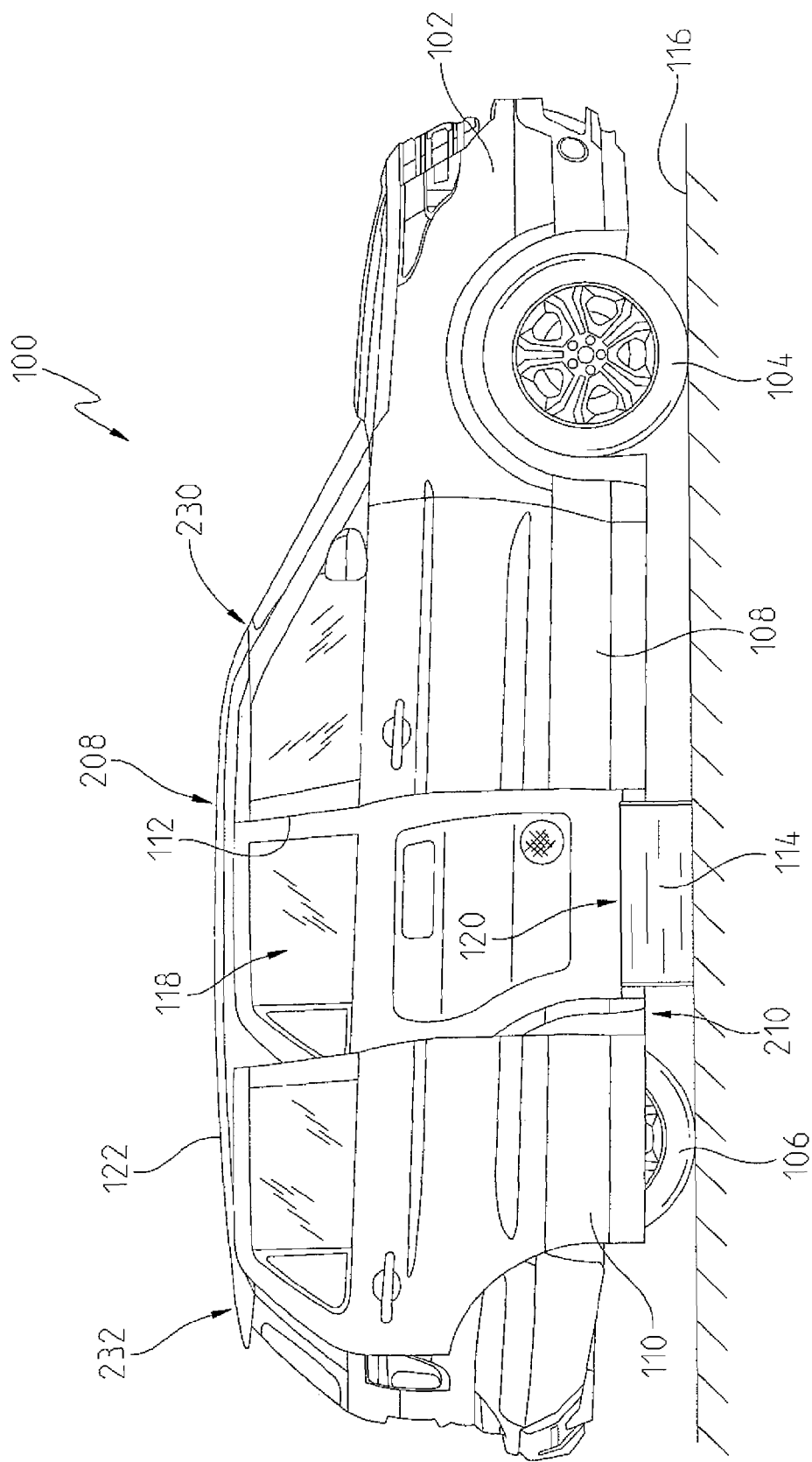
FIG. 1 illustrates an elevational side view of a motorized vehicle including an access ramp.

FIG. 1 illustrates an embodiment of a sport-utility vehicle (SUV) or crossover vehicle (CV) 100 available from any number of United States and foreign manufacturers. In one example, the vehicle is a Ford Explorer manufactured by Ford. In the illustrated embodiment, the vehicle includes a unibody construction. Other SUVs or crossover vehicles contemplated within this disclosure may include a frame on body construction. Consequently the use of SUV herein is includes all types and kinds of sport utility vehicles constructed with a body on frame construction, a unibody construction, or other constructions.

As shown in FIG. 1, the vehicle 100 may include a body or frame 102 operatively coupled to front wheels 104 and rear wheels 106. The vehicle 100 includes a unibody construction and may be designed off of a truck chassis. The vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

As shown, a first or front passenger side door 108 is located between the front wheels 104 and rear wheels 106 and provides access to a passenger for sitting in a front seat of the vehicle 100 adjacent to the driver. In this position, the passenger has a clearer view of the road when compared to sitting in a middle row or back row of seats of the vehicle 100.

The vehicle 100 of FIG. 1 has been modified to include a second passenger side door 110 coupled to the unibody frame through a mechanical linkage (not shown). In other embodiments, the side door 110 may be coupled to the unibody frame through a sliding mechanism. In a conventional vehicle such as a Ford Explorer, a passenger-side rear door is hingedly connected at two or more locations to a door frame of the vehicle so that in its open position the door is pivoted outwardly away from the vehicle about its hinges, as is understood by those skilled in the art. In this embodiment, however, the second passenger side door 110 is not hinged to a door frame, and in the open position of FIG. 1 the door 110 is disposed in a position approximately parallel with the left and right sides of the vehicle 100. Unlike a minivan, however, the door 110 does not slide along a track between its open and closed positions. Instead, in this embodiment the door 110 is coupled to the vehicle 100 via a plurality of linkages (not shown).

In addition to modifying the opening and closing of the door 110, an access opening 112 defined by a door frame of the vehicle 100 may be modified or widened to provide access to a passenger seated in a wheelchair. The opening 112 is defined on the sides thereof by a combination of a front edge of the second door 110, a rear edge of the first door 108, a vehicle floor 120, and a vehicle roof 122. The vehicle 100 may be further modified to include a ramp assembly 114 which provides rolling access of a wheelchair from a ground surface 116 into an interior 118 of the vehicle 10. The ramp assembly 114 is installed at the opening 112 and is movable between the interior 118 of the vehicle 100, where it is stored in some embodiments, and to the exterior for wheelchair access. To accommodate the ramp assembly 114, the vehicle floor may be repositioned to a location that is at least an inch or more lower than a conventional floor of the vehicle.

In other known vehicles for transporting physically limited individuals, such as minivans, one or both of the rear passenger doors slides towards the rear of the vehicle to provide access to the interior of the vehicle. The door opening is sufficiently wide to permit use of a ramp assembly or lift to transport a wheelchair-bound passenger into and out of the vehicle. In crossover and sport-utility vehicles such as the one shown in FIG. 1, however, the conventional door opening width may be 24" or less. This conventional door width is too small to enable a ramp or lift to transport a wheelchair-bound passenger into and out of the vehicle. Thus, a need exists for a modified crossover or sport-utility vehicle like the one shown in FIG. 1 that is capable of transporting a wheelchair-bound passenger into and out of the vehicle.

Figure 2:
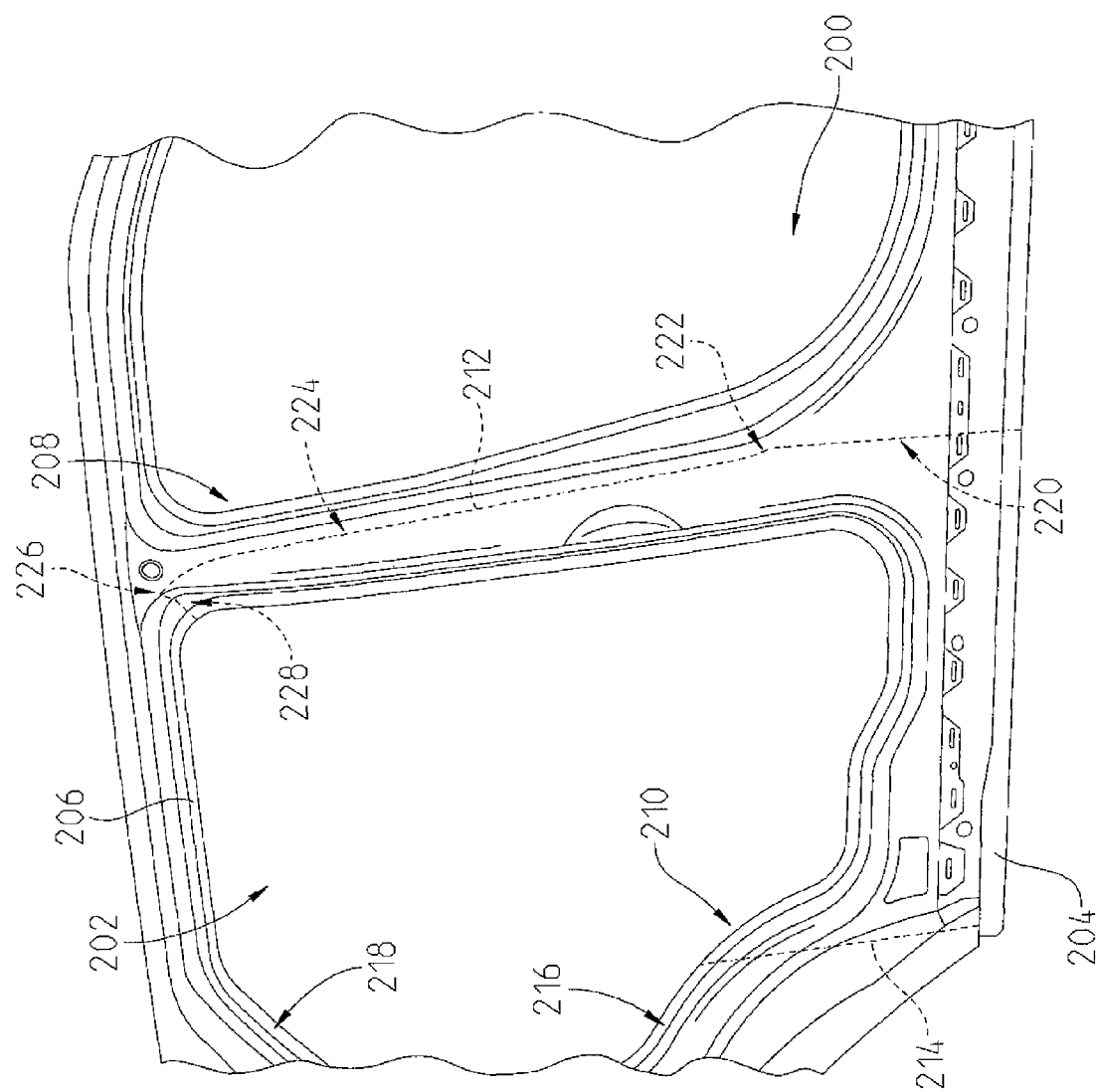
FIG. 2 illustrates a partial side perspective view of a motorized vehicle.

Referring to FIGS. 1 and 2, the vehicle 100 is designed with a plurality of pillars or supports. As shown, the vehicle 100 includes a first or A pillar 230, a second or B pillar 208, a third or C pillar 210, and a fourth or D pillar 232. Pillars are referred to as vertical or substantially vertical supports or posts of a vehicle's window area. The B pillar, for example, may be a closed steel structure welded at its bottom to the vehicle floor and at its top to a roof rail or panel. Moreover, the pillars may be multi-layered assemblies of various lengths and strengths. In any event, the pillars are designed to meet safety and crash standards for motorized vehicles.

Figure 14:
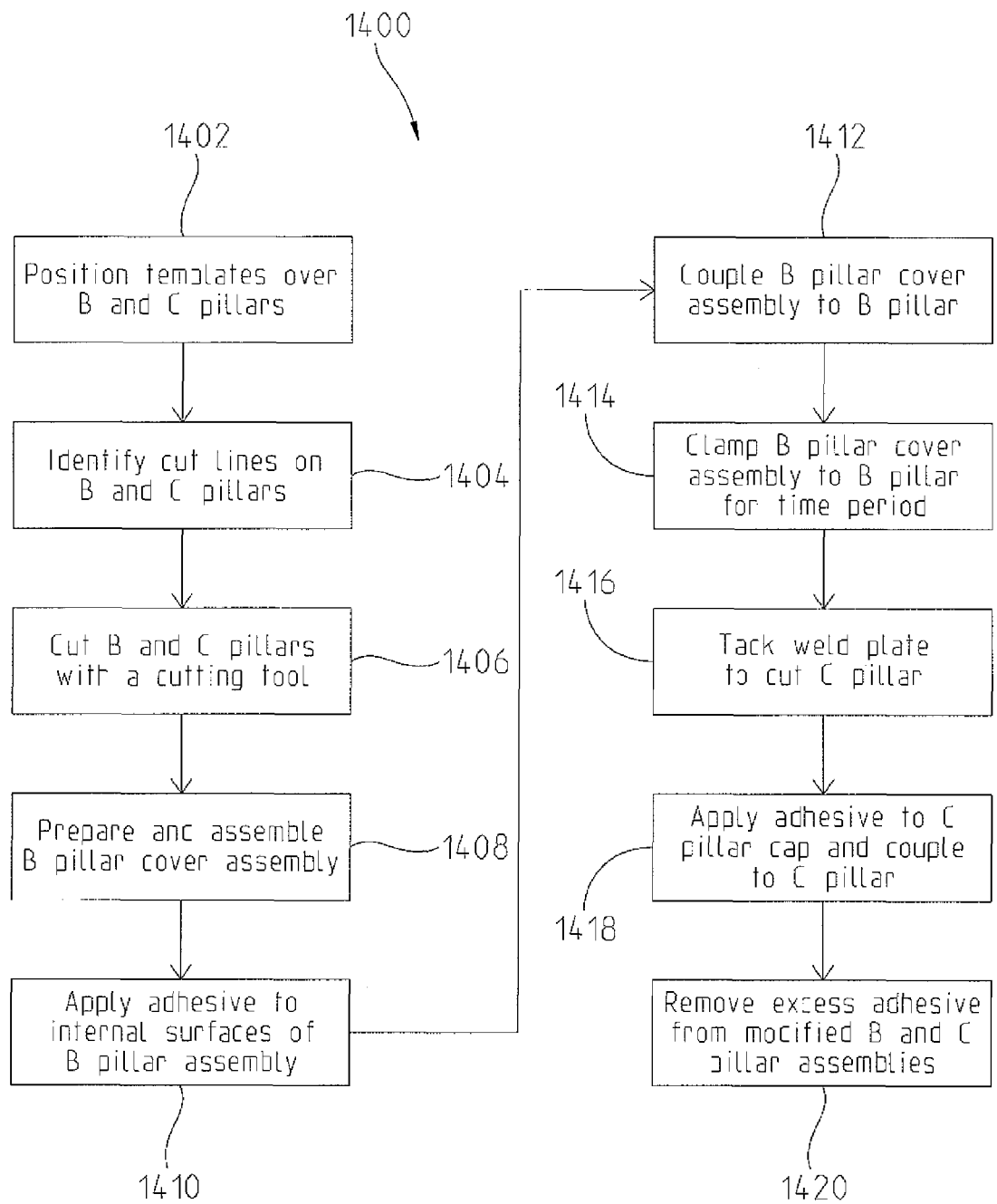
FIG. 14 illustrates a flow diagram of a process for modifying a door opening of a motorized vehicle to accommodate a ramp or floor lift.

The width of the door opening 112 may be at least partially defined by the distance between the B and C pillars. Thus, to accommodate a ramp assembly 114 or lift in the vehicle 100, the width of this opening 112 or distance between the B and C pillars may need to be increased. To do so, the present disclosure provides several embodiments for doing so including the process 1400 illustrated in FIG. 14. In FIG. 14, a plurality of blocks are shown representing one or more steps in a process for modifying a door opening of a crossover or sport-utility vehicle to accommodate a ramp or lift for a wheelchair occupant. The order of the blocks shown in FIG. 14 is not intended to be limiting, as one or more of the blocks may be ordered differently and still achieve many of the same advantages of method 1400.

Moreover, in some embodiments, not all of the blocks shown in FIG. 14 are required. In other embodiments, additional blocks may be required to execute a similar process. Thus, one skilled in the art will appreciate that the process 1400 shown in FIG. 14 is only one example and that other examples may be executed by incorporating more or less of the illustrated blocks.

In FIG. 14, the process 1400 may be executed by performing a first block 1402. Here, the process 1400 may modify either the B or C pillar or both to increase the width of the door opening. In block 1402, the B pillar 208 and C pillar 210 will be modified by first positioning a template over each pillar. The first block 1402 is partially shown in FIG. 2. As described above, the B pillar 208 is configured between the first side door 108 and the second side door 110. This may be on either the driver's side of the vehicle 100 or the passenger side thereof. Stated another way, the B pillar 208 is disposed between a front door opening 200 and a side door opening 202. The side door opening 202 in FIG. 2 may be the same as the opening 112 in FIG. 1. The B pillar 208 can extend from a bottom or floor frame 204 of the vehicle 100 to a top or roof frame 206. The C pillar 210 is shown forming part of a wheel well of one of the rear wheels 106. A first weather strip 216 is shown towards a bottom portion of the C pillar 210, whereas a second weather strip 218 is shown towards a top portion thereof.

To increase the width of the door opening 202, the B pillar 208 and C pillar 210 may be modified. In FIG. 2, a cut line 212 is shown on the B pillar 208. In block 1402 of the modification process 1400, a template (not shown) may be positioned over a rear portion of the B pillar 208 so that the cut line 212 may be identified in block 1404. Similarly, another template (not shown) may be positioned over the C pillar 210 to identify a cut line 214 on the C pillar 210.

The B pillar cut line 212 can be defined by a plurality of portions. For instance, the line 212 may include a first portion 220, a second portion 224, and a third portion 228. The first portion 220 and second portion 224 may connect with one another at a first bend or intersection point 222. Likewise, the second portion 224 and third portion 228 may connect with one another at a second bend or intersection point 226. The first portion 220 may extend from the vehicle floor or lower frame 204 to the first bend 222. The second bend 226 may be located approximately at or near the roof frame 206 of the vehicle. Moreover, the third portion 228 can include part of the second weather strip 218 as shown in FIG. 2. While the cut line 212 is showing being substantially linear, this is only one example. Other cut lines may include more curvature. Similarly, the C pillar cut line 214 may be substantially linear as shown in FIG. 2, but the cut line 214 may also include curvature in other embodiments.

In addition, the first bend 222 and second bend 226 of the B pillar cut line 212 may be angularly defined relative to the different portions of the cut line 212, as shown in FIG. 2. The first bend 222, for example, is angled at an acute angle, i.e., less than 90°, relative to the first portion 220 of the cut line 212. The second bend 224, however, is angled at an obtuse angle, i.e., greater than 90° and less than 180°, relative to the second portion 224. These angles are defined between the first portion line 220 and second portion line 224 and the second portion line 224 and the third portion line 228, respectively. The cut line 212 shown in FIG. 2, however, is only intended to serve as one embodiment, and other cut lines may be used to modify the B pillar (and C pillar). Thus, this disclosure does not intend to restrict the shape of the cut lines 212, 214 to those shown in FIG. 2.

Once the cut lines are identified on the B pillar 206 and C pillar 208, the process 1400 can advance to block 1406. Here, both pillars can be cut along the respective lines so that a portion of each pillar is removed. Any number of conventional tools and instruments may be used to remove the material from each pillar, including a reciprocating saw, cut off wheel, etc. In most instances, the type of tool or instrument used in block 1406 is not as important so long as the material removed from each pillar corresponds with the cut lines identified in block 1404. Once the material is removed from the B pillar 208 and C pillar 210, the door opening width is greater than that of the conventional door width. However, the remainder of process 1400 provides additional blocks for executing to ensure strength and rigidity to the pillars to meet federal safety requirements.

In block 1408 of the process 1400, a B pillar cover assembly is prepared and assembled. Referring to FIGS. 3-7, a B pillar cover assembly 300 is shown in varying amounts of detail. The B pillar cover assembly 300 is designed to couple with the cut B pillar at the location where the material was removed from the B pillar in block 1406. Thus, the cover assembly 300 may cover a cavity formed by the removed material and provide the necessary structural integrity to meet the necessary safety requirements of the vehicle. In FIGS. 3 and 4, the B pillar cover assembly 300 includes a bottom end 302 and a top end 304. When assembled and coupled to the B pillar 208, the bottom end 302 is positioned near the bottom frame or floor 204 of the vehicle and the top end 304 is positioned near the top frame or roof 206 of the vehicle.

In FIG. 3, an outer surface and features of the B pillar cover assembly 300 are shown. The outer surface is meant to refer to the external surface of the assembly 300 when coupled to the B pillar, i.e., the surface visible once coupled. In FIG. 4, the opposite or internal surface and features are shown. In other words, the internal surface and features may face the cut B pillar 208 once coupled thereto.

In one embodiment, the B pillar cover assembly 300 may be structured as a single member or body. In a different embodiment, the B pillar cover assembly 300 may be structured as two or more members or bodies. In the illustrated embodiment of FIGS. 3-7, the cover assembly 300 is structured as having a first member 306, a second member 308, a third member 310, and a fourth member 312. Each member can be formed by a casting process, including each protrusion, ridge, cavity, and through-hole formed in each respective piece. In other embodiment, however, other processes such as three-dimensional printing, additive manufacturing, etc. may be used to form each member. Also in this embodiment, each member may have a defined length less than 18". In other embodiments, there may be more than four members to form the B pillar cover assembly 300 so long as the assembly does not warp, or if there is any warping it can be minimized.

Figure 9:
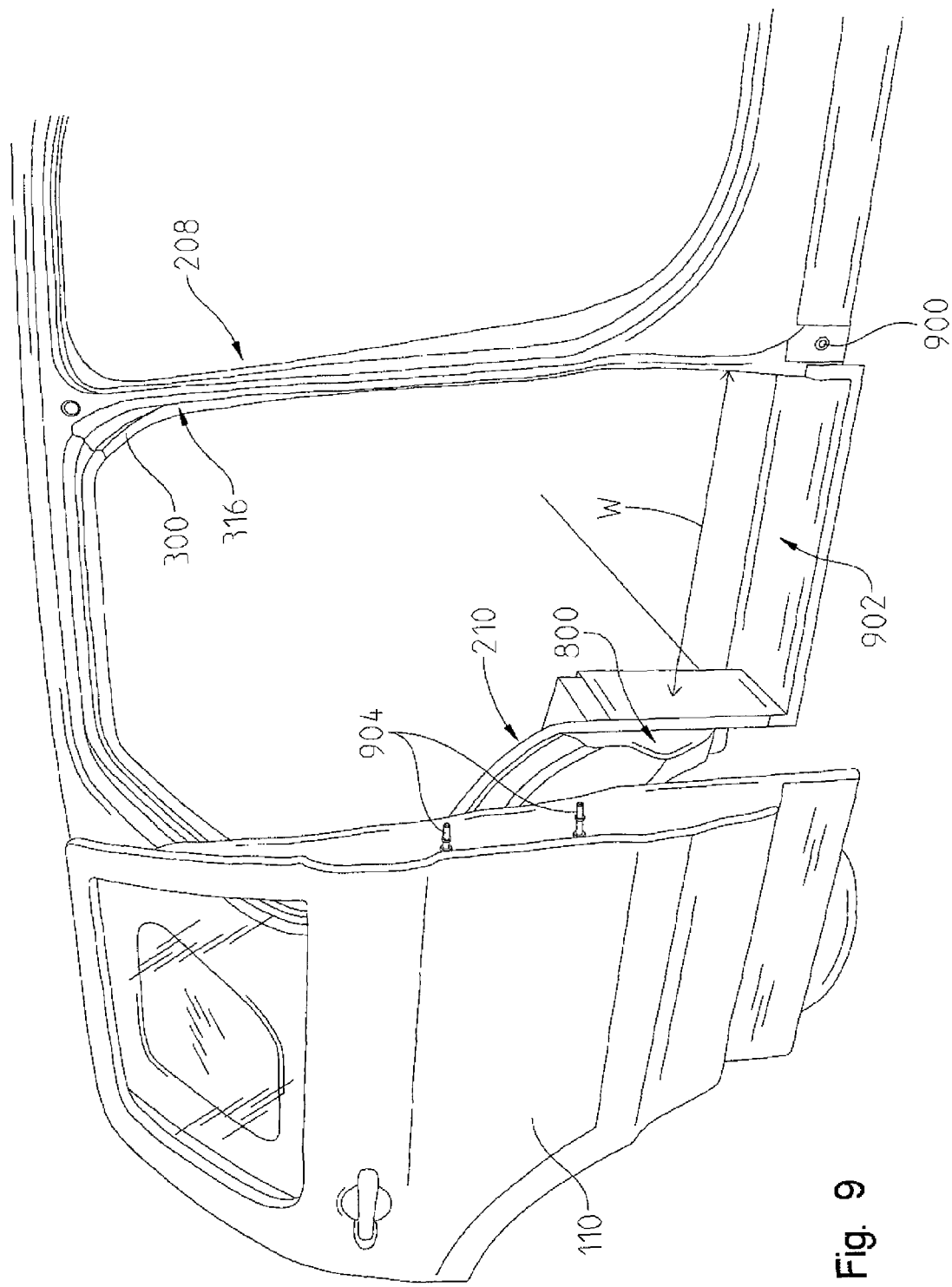
FIG. 9 illustrates a side perspective view of a modified rear passenger door opening of the motorized vehicle of FIG. 1.

In FIG. 3, the external surface of the B pillar cover assembly 300 may include an outer ridge or weather strip 316 that extends from a location on the first member 306 to a location on the fourth member 312. The weather strip 316 is also shown in FIG. 9 when the B pillar cover assembly 300 is coupled directly to the B pillar. In addition, a pair of door alignment assemblies 314 are shown coupled to the external surface of the B pillar cover assembly 300. One door alignment assembly 314 may be coupled to the second member 308 and another door alignment assembly 314 may be coupled to the third member 314. Each door alignment assembly 314 may be positioned along the B pillar cover assembly 300 so that when the assembly 300 is coupled to the B pillar 208, the door alignment assemblies 314 may be used to align the door into engagement with the B pillar 208 in a closed position.

Figure 5:
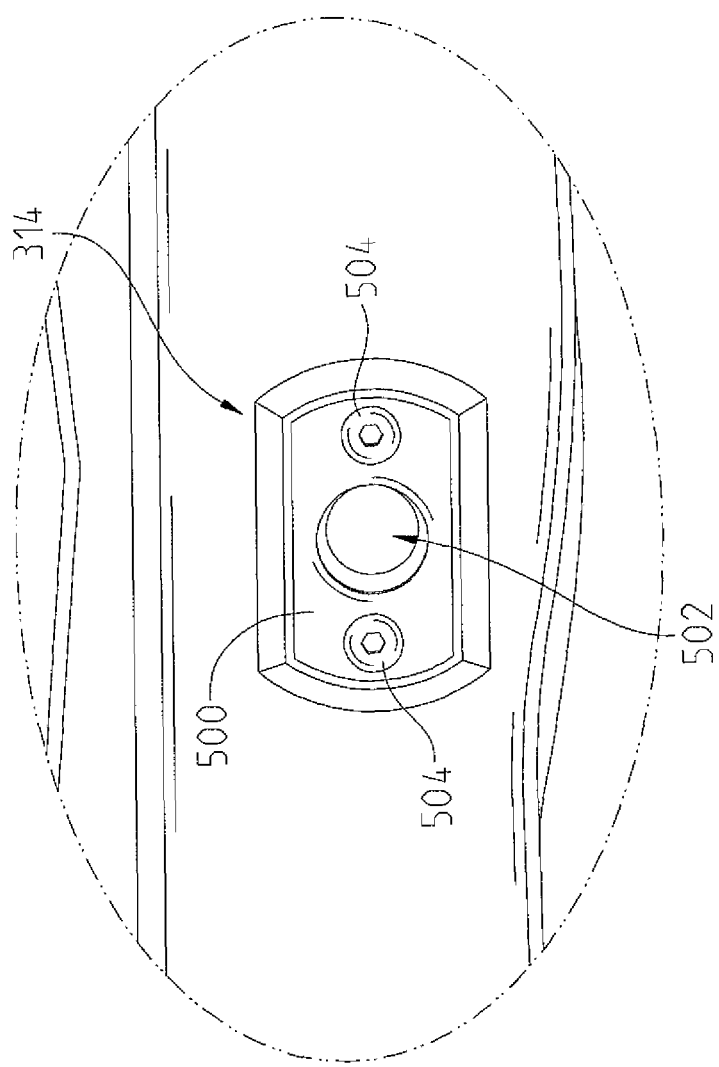
FIG. 5 illustrates an elevational side view of a door alignment assembly.

As shown in the embodiment of FIGS. 4 and 5, the door alignment assembly 314 may include a body 500 with a pair of through-holes (not shown) and a cavity or recess 502. The body 500 can be formed of a plastic material or the like. Other materials may also be used for the body, including steel or aluminium. The cavity or recess 502 may take the form of a tapered hole, for example, and in some embodiments the recess 502 may take the form of a through-hole. Screws or other fasteners 504 may be positioned within each through-hole (other than the recess 502) defined in the body 500 for coupling the door alignment assembly 314 to the B pillar cover assembly 300. For instance, another set of through-holes 408 are defined in the second member 306 for receiving the screws or other fasteners 504 of one door alignment assembly 314. Likewise, a different set of through-holes 412 may be defined in the third member 310 for receiving screws or other fasteners 504 to secure the other door alignment assembly 314. The second member 308 may also include a first recess or through-hole 406 disposed in mating alignment with the recess 502 of the first door alignment member 314 when the assembly 314 is coupled to the second member 308. Likewise, the third member 310 may include a second recess or through-hole 410 disposed in mating alignment with the recess 502 of the second door alignment member 314 when the assembly 314 is coupled to the third member 310. The door 110 may include pins 904 (see FIG. 9) that engage or otherwise mate with the recesses 502 defined in each door assembly member 314 and member of the B pillar cover assembly 300.

In an alternative embodiment, however, a different door alignment feature may be used. For example, a bar member or striker similar to those used on many conventional vehicles may be coupled to the B pillar cover assembly 300. Here, a latch or hook on the door 110 may couple to the bar member or striker to facilitate a coupling between the door and modified B pillar. Other mechanisms may be used to couple the door to the modified B pillar besides that described in this disclosure.

In FIG. 4, the internal surface and features of the B pillar cover assembly 300 are shown. As previously described, the assembly 300 may be formed by four different members, although other embodiments may include any number of members. As shown, the first member 306 and second member 308 may be coupled to one another by a first coupling assembly 400. The second member 308 and third member 310 may be coupled by a second coupling assembly 402. Further, the third member 310 and fourth member 312 may be coupled by a third coupling assembly 404. These coupling assemblies are shown in greater detail in FIG. 6.

For instance, the first coupling assembly 400 may include a tab 600 formed on one end of the second member 308 to be received by a pair of guides 602 and end guide 604 formed on the first member 306. The tab 600 may be slidably engaged with the guides 602 until an end of the tab 600 abuts with the end guide 604. There may be additional guides 602 besides the two shown in FIG. 6. Moreover, the guides 602 and end guide 604 may be formed by the casting process on the first member 306, or the guides 602 and end guide 604 may be separate structures that are welded to the internal surface of the first member 306.

The second coupling assembly 402 and third coupling assembly 404 may be structured similarly to the first coupling assembly 400. For example, in FIG. 6, the second coupling assembly 402 may include a tab 606 extending from one end of the third member 310 and which may be slidably engaged with a pair of guides 608 and an end guide 610 formed on the second member 308. The tab 606 may be either formed during the casting process on the third member 310 or welded thereto after the casting process. Likewise, the guides 608 and end guide 610 may be formed on the second member 308 during the casting process or welded thereto after the casting process. The third coupling assembly 404 may include a tab 612 extending from the fourth member 312 and which may be slidably engaged with a pair of guides 614 and an end guide 616 formed on the third member 310. The tab 612 may be formed on the fourth member 312 during the casting process or welded thereto after the casting process, and the guides 614 and end guide 616 may be formed on the third member 310 during the casting process or welded thereto after the welding process. The aforementioned guides and end guides may form a sleeve that receives the tab for coupling any of the two members to one another.

Referring to FIG. 4 again, the B pillar cover assembly 300 may include a plurality of features formed on its internal surface during the casting process. For example, these plurality of features may include a first body 414, a second body 416, a third body 418, a fourth body 420, a fifth body 422, a sixth body 424, and a seventh body 426. In FIG. 4, the first body 414 is formed on the first member 306 and the sixth body 424 is formed on the second member 308. The second body 416 and seventh body 426 may be formed on the third member 310, and the third body 418, fourth body 420, and fifth body 422 may be formed on the fourth member 312. There may be additional bodies formed during the casting process on either the internal or external surfaces of the B pillar cover assembly 300 other than those shown in FIGS. 3-7. One or more of these bodies may be formed in locations to provide reference guides towards coupling the B pillar cover assembly 300 to the B pillar 208. In this manner, these one or these bodies may contact or abut against a back edge of the B pillar 208 to facilitate the alignment and positioning of the B pillar cover assembly 300 with respect to the back surface or wall of the B pillar 208. This will be further address with respect to block 1412 of the process 1400.

Figure 6:
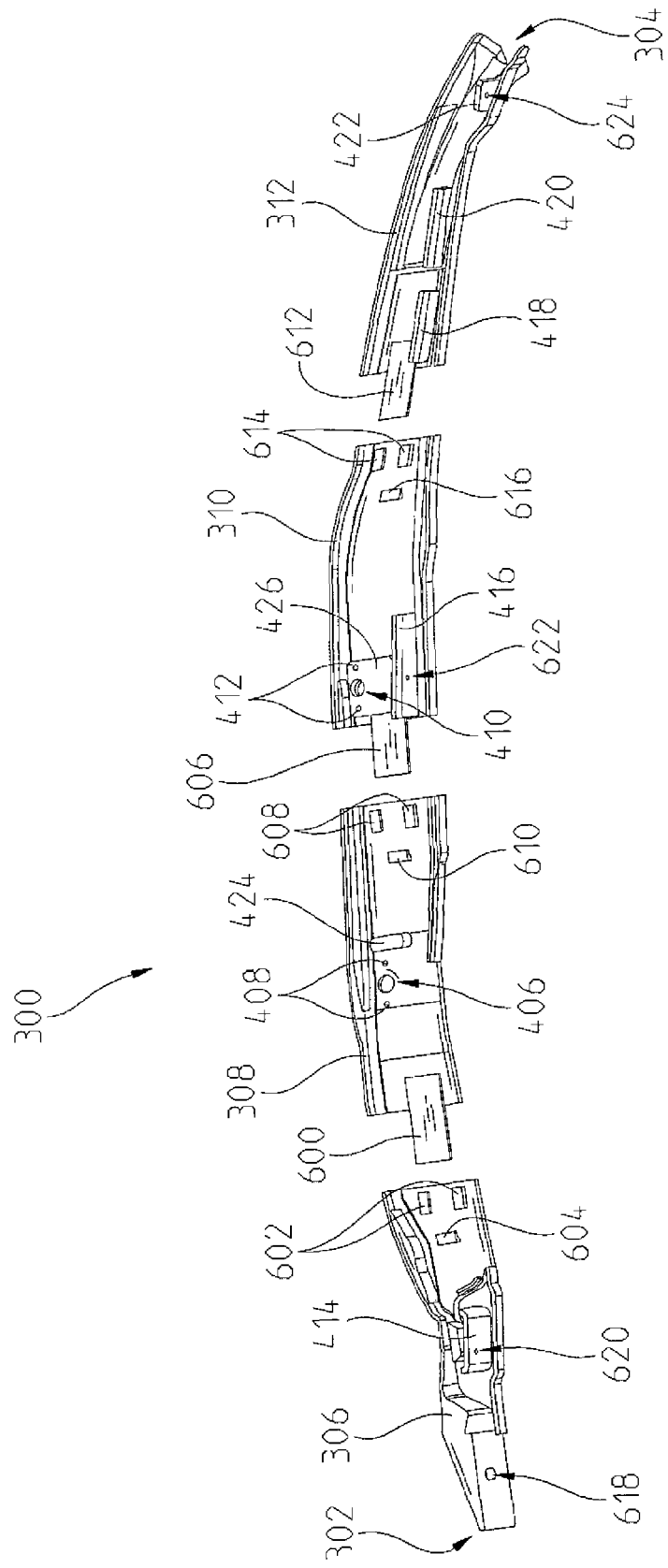
FIG. 6 illustrates an elevational side view of the B pillar assembly of FIG. 3 disassembled.

Returning to block 1408 of the process 1400, the B pillar cover assembly 300 may include additional preparation prior to assembly. For instance, in FIG. 6 the first member 306 may be formed to include a through-hole 618. The through-hole 618 may be formed during the casting process, or the through-hole 618 may be formed during block 1408 of the process 1400. For example, the through-hole 618 may be formed by a reaming process. Other holes or openings may also be formed during the preparation process of block 1408. For example, a first threaded opening 620 may be formed in the first body 414 as shown in FIG. 6. A second threaded opening 622 may be formed in the second body 416 and a third threaded opening 624 may be formed in the fifth body 422. Each of the three openings may be formed during or after the casting process. In block 1408, each opening may be reamed with a drill bit and then tapped with threads. The threaded openings may be used in block 1412 for coupling the B pillar cover assembly 300 to the B pillar 208.

As previously described, the B pillar cover assembly 300 can include a plurality of bodies, protrusions, ridges, grooves, channels, cavities, flanges, and the like formed on its inner or internal surfaces. These features shown in FIG. 6 are only done so as an example of the design of the B pillar cover assembly 300. One skilled in the art will appreciate that different B pillar cover assemblies may be designed to include additional or fewer features, or features formed in different locations, for purposes of coupling the B pillar cover assembly to the B pillar.

Once each member of the B pillar cover assembly 300 is prepared, the members may be coupled to one another to form the entire assembly 300. In FIG. 6, the first member 306 and second member 308 may be assembled to one another by slidably engaging the first tab 600 to the first pair of guides 602 and end guide 604. The second member 308 and third member 310 may be assembled to one another by slidably engaging the second tab 606 to the second pair of guides 608 and end guide 610. Lastly, the third member 310 and fourth member 312 may be assembled to one another by slidably engaging the third tab 612 to the third pair of guides 614 and end guide 616. Once slidably engaged, the first member 306, second member 308, third member 310, and fourth member 312 are assembled to one another to form the B pillar cover assembly 300. Once assembled, block 1408 may further include a welding operation whereby the first member 306 and second member 308 are welded to one another, the second member 308 and third member 310 are welded to one another, and the third member 310 and fourth member 312 are welded to one another. In block 1408, a coating process may also be executed whereby the entire cover assembly or only a portion thereof may be coated with a desired finish (e.g., a black paint).

Once the B pillar cover assembly 300 is prepared and assembled in block 1408, the process 1400 may advance to block 1410. In block 1410, the cover assembly 300 is prepared for being coupled to the B pillar 208. To do so, a surface of the B pillar cover assembly 300 may be prepared in advance of adhesive being applied thereto. For example, the surface may be cleaned by using an alcohol wipe or cloth. A cleaning solution may also be used for cleaning the surface of the cover assembly. In addition, the surface of the B pillar may be cleaned in a similar manner.

Figure 7:
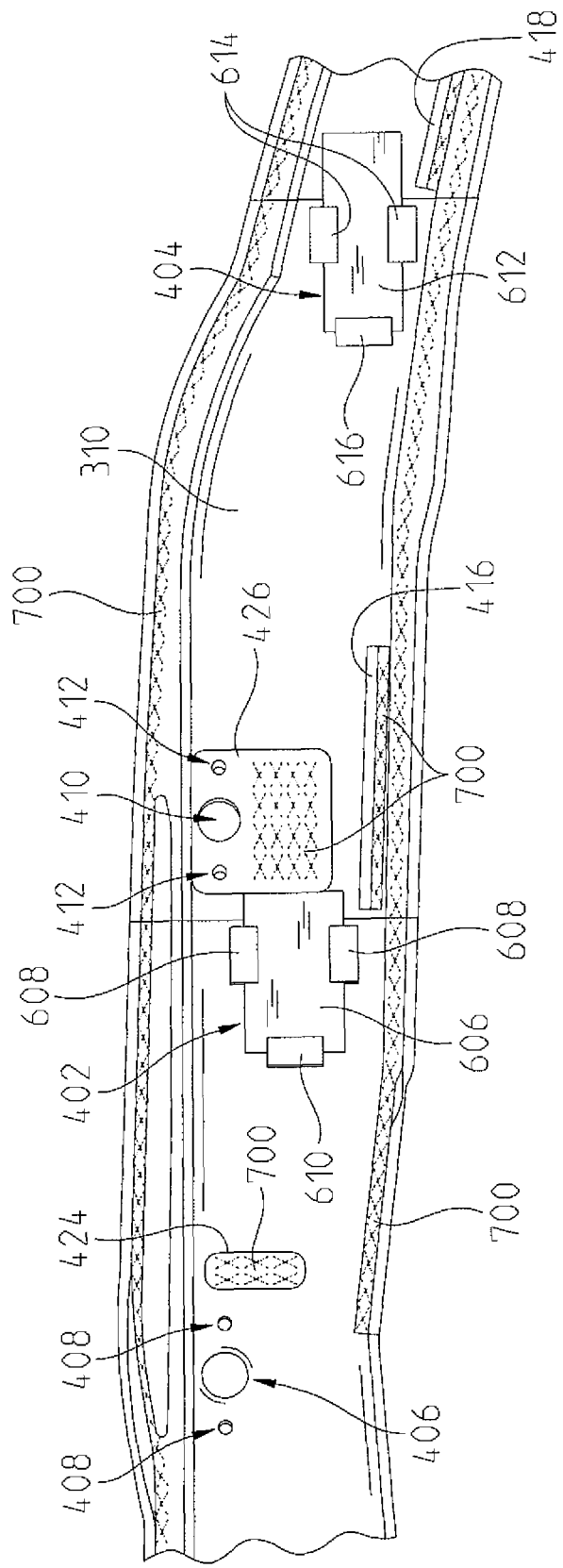
FIG. 7 illustrates a partial elevational side view of the B pillar assembly of FIG. 3.

Once the surfaces of the cover assembly 300 and B pillar are clean, an adhesive may be applied to the internal surface of the cover assembly 300. More particularly, and as shown in FIG. 7, an adhesive 700 may be applied to the plurality of bodies as previously described. The adhesive 700 may also be applied to grooves, cavities, openings, recesses, ridges, flanges, and other portions of the B pillar cover assembly 300 for coupling to the B pillar. In the example shown in FIG. 7, the adhesive 700 is shown being applied to the sixth body 424, the seventh body 426, and the third body 418.

Once the adhesive is applied to the B pillar cover assembly 300 in block 1410, the process 1400 may advance to block 1412 to couple the B pillar cover assembly 300 to the B pillar 208. The manner in which the cover assembly 300 is coupled to the B pillar 208 can be described with respect to the illustrated embodiment of FIG. 13.

Figure 13:
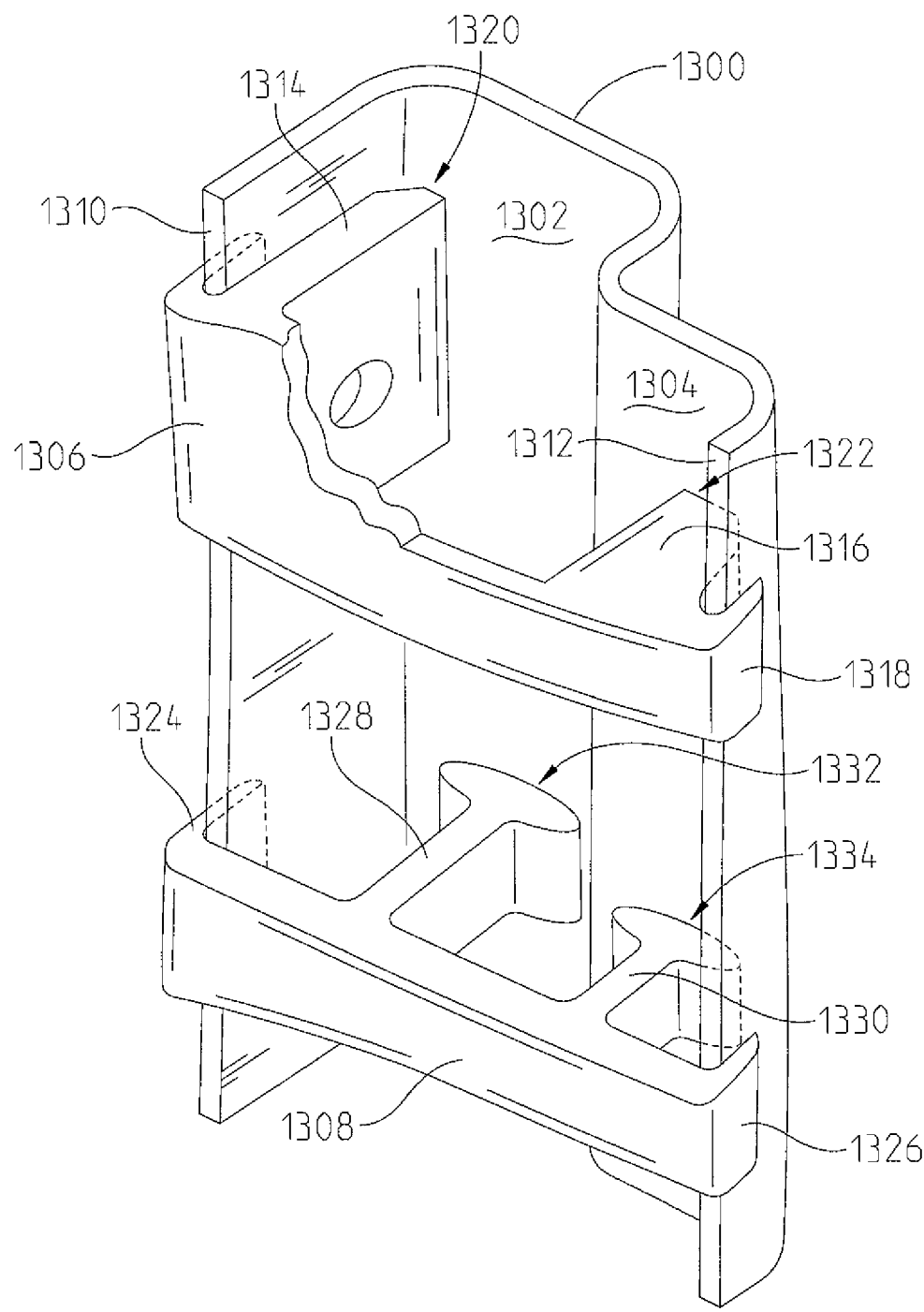
FIG. 13 illustrates a partial side perspective view of another embodiment of a modified B pillar assembly being coupled to a B pillar.

In FIG. 13, a B pillar 1300 is shown after it has been cut in block 1406. As shown, an internal cavity is shown that requires to be covered by a B pillar cover assembly. The B pillar 1300 includes a first internal wall surface 1302 and a second internal wall surface 1304. The B pillar 1300 also includes a first end 1310 and a second end 1312. In a first example shown in FIG. 13, a B pillar cover assembly 1306 is shown being coupled to the B pillar 1300. The cover assembly 1306 may include a body structure formed by a first protrusion 1314 and a second protrusion 1316 that are disposed within the cavity defined by the B pillar 1300. The assembly 1306 also includes an arm 1318 that engages the B pillar on the outside of the first end 1310 and second end 1312. The B pillar cover assembly 1306 defines a first groove between the arm 1318 and the first protrusion 1314 and a second groove between the arm 1318 and the second protrusion 1316.

As the cover assembly 1306 is coupled to the B pillar 1300, it does so in a tongue-and-groove-like manner. The first end 1310 is disposed within the first groove and the second end 1312 is disposed within the second groove. The first and second grooves may be oversized so that the engagement is not completely a press-fit engagement (i.e., more like a close-fit rather than a press-fit, although in some embodiments the engagement may be a press-fit). As such, adhesive 700 may be applied in the first and second grooves to further adhere the cover assembly 1306 to the B pillar 1300.

The aforementioned plurality of bodies described above and shown in FIGS. 4 and 6 may function similar to the first and second protrusions of FIG. 13. Here, the first protrusion 1314 may engage the B pillar 1300 at a first abutment location 1320, and the second protrusion 1316 may engage the B pillar 1300 at a second abutment location 1322. These protrusions or bodies may be used to correctly align and position the B pillar cover assembly to the B pillar. For example, the cuts made in block 1406 may not be entirely precise to ensure the cover assembly does not "float" due to tolerances when coupled to the B pillar. In other words, the cuts may not be precisely the same for each process of forming the modified B pillar, and thus the protrusions and bodies may be used to abut with the internal walls 1302, 1304 of the B pillar to ensure proper alignment and positioning of the B pillar cover assembly. In addition, since the back or internal walls of the B pillar are used for positioning the cover assembly to the B pillar, subsequently executed processes 1400 can be carried out consistently.

A second B pillar cover assembly 1308 is also shown in FIG. 13. Here, the cover assembly 1308 may include a main body having a first protrusion 1328 and a second protrusion 1330. Likewise, the main body of the assembly 1308 may include a first arm 1324 and a second arm 1326. The first and second arms may be coupled via adhesive to the first end 1310 and second end 1312 of the B pillar 1300. Moreover, the first protrusion 1328 may engage the back or internal wall 1302 of the B pillar 1300 at a first abutment location 1332 and the second protrusion 1330 may engage the back or internal wall 1304 at a second abutment location 1334. Each of the first B pillar cover assembly 1306 and the second B pillar cover assembly 1308 may be coupled to the B pillar 1300 in different ways, but each uses internal protrusions or bodies for properly aligning and positioning the cover assembly to the pillar.

Figure 10:
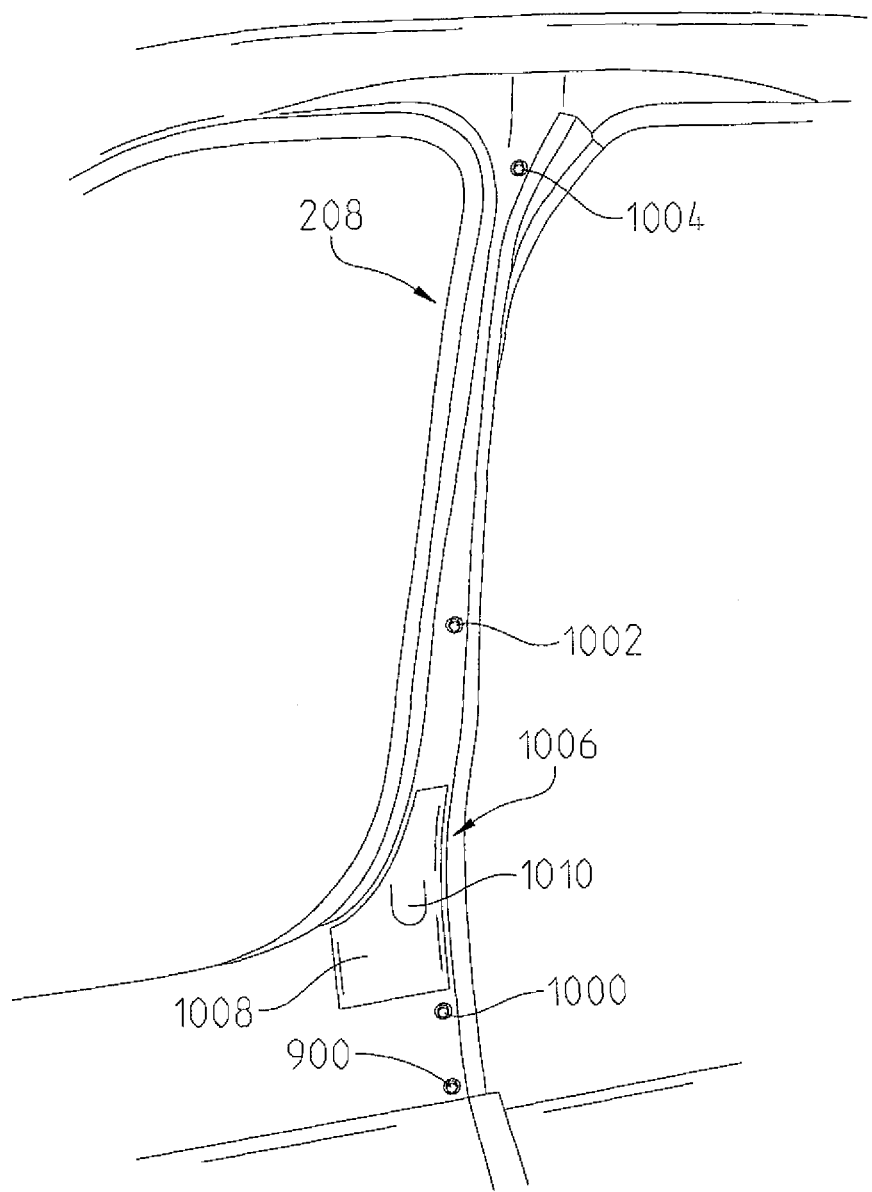
FIG. 10 illustrates a partial side elevational view of a modified B pillar from inside the motorized vehicle of FIG. 1.

Returning to block 1412, the B pillar cover assembly 300 may be coupled to the B pillar 208 via adhesive and a secondary means. The secondary means may be a mechanical connection or other similar connection. For instance, a plurality of mechanical fasteners may be used to further secure the B pillar cover assembly 300 to the B pillar 208. Referring to FIG. 6, the first member 306 of the cover assembly 300 includes a first defined through-hole or opening 618 and a threaded hole 620. The threaded hole 620 is defined in the first body 414 as shown. Referring to FIGS. 9 and 10, a first mechanical fastener 900 of the plurality of mechanical fasteners can secure the bottom end 302 of the B pillar cover assembly 300 to the B pillar 208. The mechanical fastener 900 may include a bolt installed on the interior of the vehicle with a corresponding washer and nut secured to the bolt. Alternatively, a screw or other type of fastener may be used. In FIG. 10, another mechanical fastener 1000 may couple to the threaded hole 620 in the first member 306.

As also shown in FIG. 6, the third member 310 may include a hole or opening 622 that is defined in the second body 416. The hole or opening 622 may be threaded for receiving a mechanical fastener 1002 as shown in FIG. 10. Likewise, the fourth member 312 may include a hole or opening 624 that is defined in the fifth body 422. The hole or opening 624 may be threaded for receiving a mechanical fastener 1004 as shown in FIG. 10. Thus, as shown, each of the aforementioned fasteners may be used in conjunction with the adhesive for coupling the B pillar cover assembly 300 to the B pillar 208.

Once the B pillar cover assembly 300 is coupled to the B pillar, the process 1400 may advance to block 1414. As described above, the adhesive 700 may be applied to the B pillar cover assembly 300 in block 1410. As the adhesive 700 is applied, a working time of the adhesive is triggered where the viscosity of the adhesive begins to thicken. In one non-limiting example, the working time may be less than an hour. During this working period of time, blocks 1412 and 1414 may be executed. In block 1414, for example, clamps or other similar devices may be used to clamp the B pillar cover assembly 300 to the B pillar 208. Once clamped, a waiting period is triggered. The waiting period can be defined as a fixture time, where the adhesive gains its strength after being applied to the part. In one non-limiting example, this may be an hour or less. Some adhesives may require a longer fixture time and thus the waiting period may be longer. The length of the waiting period may be related directly to the type of adhesive used in block 1410. Once the waiting period expires, the clamps or other similar devices may be removed from the B pillar 208. The adhesive may not fully cure for a day or more, but once the clamps are removed the process may advance to block 1416.

As shown best in FIG. 10, the modification of the B pillar may also include modification of a seat belt restraint 1006 for the front passenger seat. If this modification occurred on the driver's side, then the modification of the B pillar may require a relocation of the seat belt restrain for the driver's seat. As shown in FIGS. 9-10, an increase in door width, w, may produce an open cavity (not shown) on the inside of the B pillar 208. Here, a plate 1008 may be secured to the interior of the B pillar and a clip 1010 may be formed on the plate 1008. A seat belt restraint 1006 may be coupled to the clip 1010 or directly to the plate 1008. In any event, the location of the seat belt restraint may be moved towards the front of the vehicle 100, and in some instances, closer towards the floor of the vehicle. The relocation may only be approximately 2-3 inches, although in other vehicles 100 it may be different. By increasing the width, w, of the entry 902 into the vehicle 100, a ramp or lift (not shown) may be installed in the vehicle to allow a wheelchair to be moved into and out of the vehicle 100.

Figure 8:
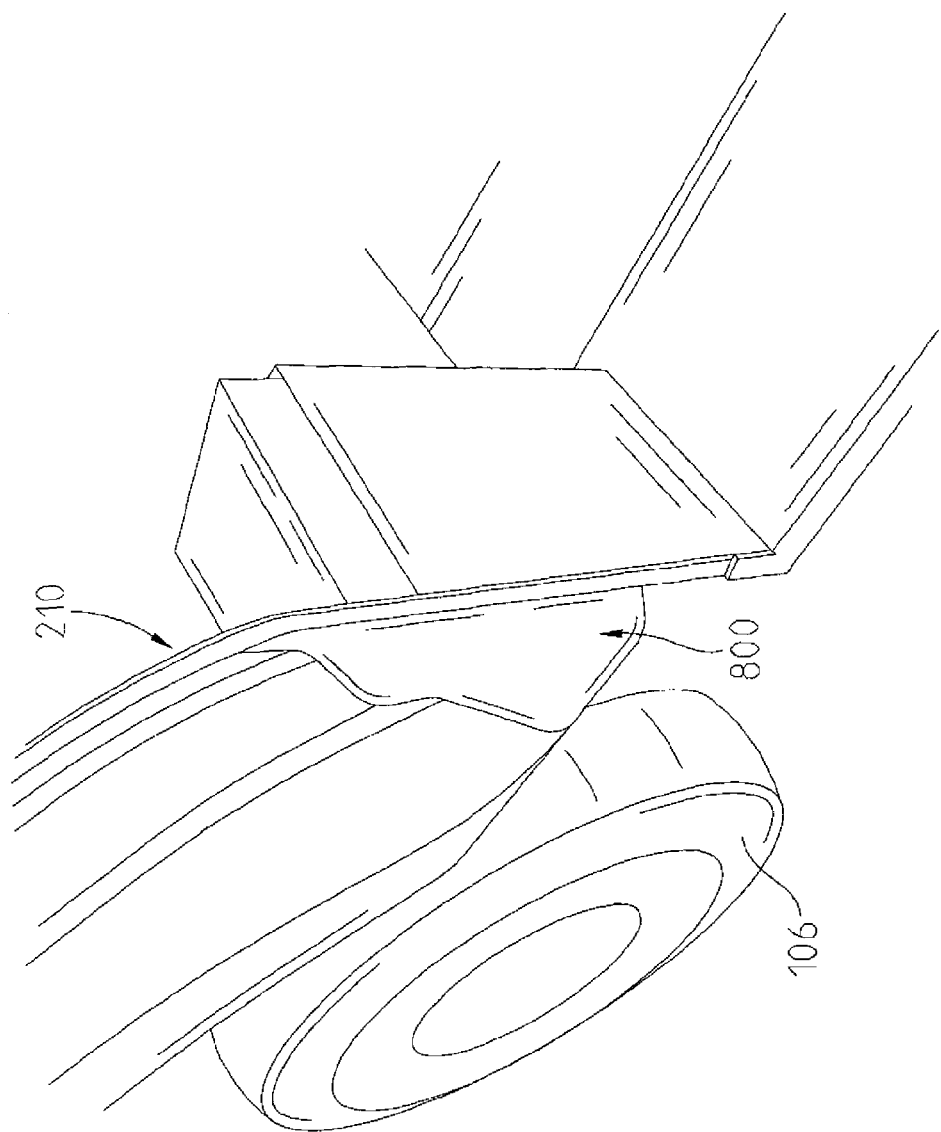
FIG. 8 illustrates a partial side perspective view of a modified C pillar assembly.
Figure 11:
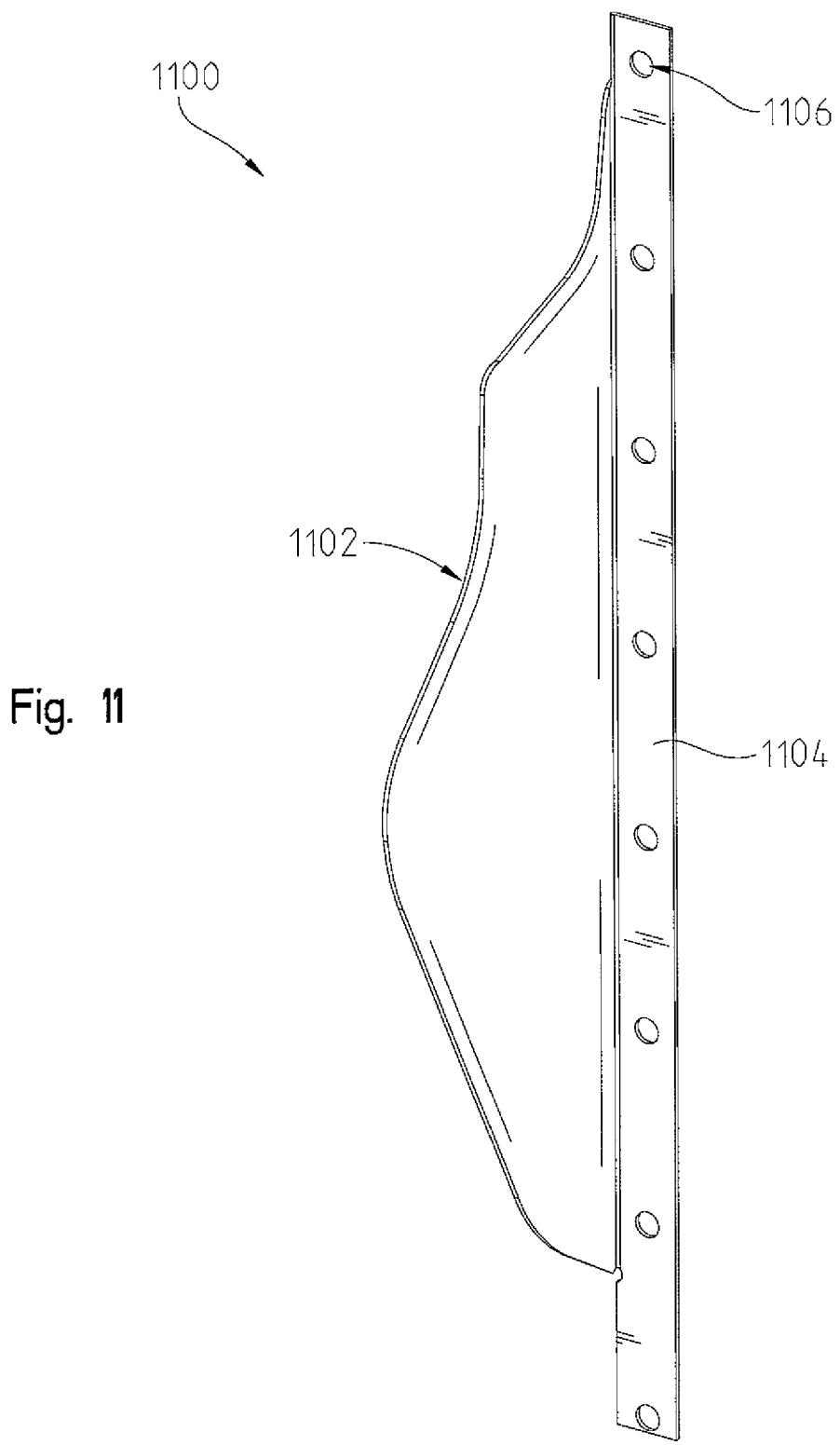
FIG. 11 illustrates a side perspective view of an embodiment of a plate forming part of the modified C pillar assembly of FIG. 8.

Returning to the process 1400, in block 1406 the C pillar 210 is also cut. Once the B pillar cover assembly 300 is coupled to the B pillar 208, block 1416 can be executed. Here, a plate may be coupled to the cut C pillar 210. Referring to FIGS. 8 and 11, a modified C pillar 800 is shown. First, a reinforcement plate 1100 may be coupled to the C pillar 210 after it has been cut. Similar to after the B pillar 208 is cut, a cavity or open space (not shown) is created after the C pillar 210 is cut in block 1406. Thus, the plate 1100 in FIG. 11 is used to first cover the cavity or open space.

The reinforcement plate 1100 may include a contoured surface or edge 1102 used to mate with the contour of the cut C pillar. The edge 1102 of the plate 1100 is designed to match the cut portion of the C pillar 210. The plate 1100 may also include a sheet metal portion 1104 that defines a plurality of holes 1106 therein. The plate 1100 may be formed of a metallic material such as steel. The plate 1100 may be coupled via tack welding or other coupling process to the C pillar 210. Here, the sheet metal portion 1104 forms a flange-like piece with the plurality of holes 1106 defined therein, and the flange-like piece can be tack-welded to a similar flange body (not shown) on the C pillar 210. The plate 1100 may be coupled to the C pillar 210 to prevent water and other liquids from collecting or spraying into the wheel well area of the vehicle 100 and causing rust or other damage.

Figure 12:
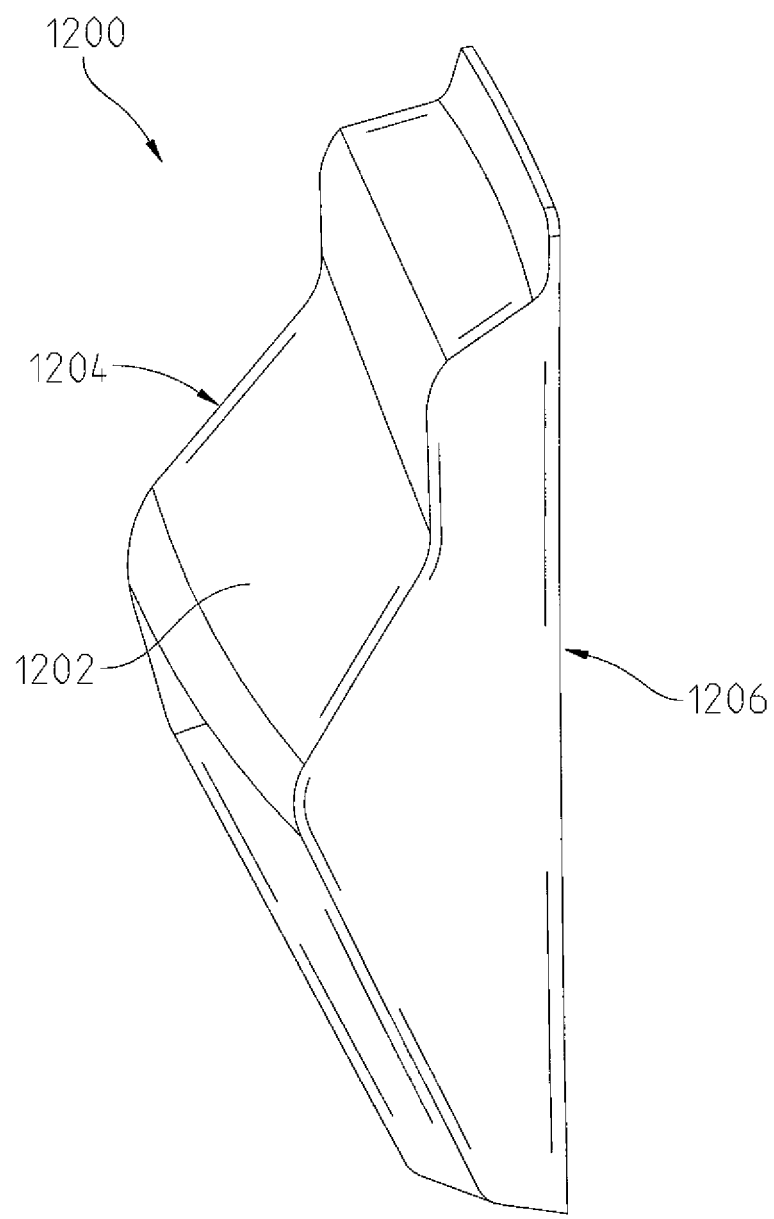
FIG. 12 illustrates a side perspective view of an embodiment of a C pillar cap forming part of the modified C pillar assembly of FIG. 8.

Once the tack welding process is complete, the process 1400 can advance to block 1418 where a C pillar cap 1200 may be coupled to the C pillar 210. Referring to FIG. 12, the C pillar cap 1200 may be formed of a vacuum-formed plastic material. The cap 1200 may include a plurality of edges or surfaces. For example, the cap 1200 may include a contoured surface 1202, a first planar edge 1204, and a second planar edge 1206. An adhesive, such as the one used in block 1410, may be applied to the planar surfaces 1204, 1206 of the C pillar cap 1200 for coupling the cap 1200 to the C pillar 210 and reinforcement plate 1100. The contour surface 1202 of the C pillar cap 1200 may correspond substantially similar with the contour of the C pillar 210 and the contour surface 1102 of the reinforcement plate 1100. A clamp or other device may be used to hold the C pillar cap 1200 to the surfaces of the reinforcement plate 1100 and C pillar 210 for a period of time until the adhesive reaches a dry state. The period of time may be the same as the waiting period described in block 1414. Once the adhesive dries, the C pillar cap may completely or substantially seal the modified C pillar 800 from moisture and other contaminants. Moreover, the cap 1200 may be pre-painted to have a color identical to or similar to the rest of the vehicle 100.

After block 1418, the process 1400 may advance to block 1420. In block 1420, excess adhesive may be wiped away or removed from the modified B and C pillars. There may be other blocks executed in a different process than that of FIG. 14. In addition, the blocks described above and shown in FIG. 14 can be executed in different sequential orders, and so the embodiment of FIG. 14 is not intended to be limiting. For instance, blocks 1416 and 1418 can be executed before or at the same time as blocks 1406, 1408, 1410, 1412, and 1414. These other blocks may depend on the type and style of vehicle. In any event, once the B and C pillars are modified, the vehicle 100 is now better able to incorporate a ramp 114 or wheelchair lift. The modification process may increase the width from a conventional 24 inches to almost 30" at its smallest width. The width may be increased to a width greater than 30 inches, particularly if the type of ramp being installed requires a larger width. The B and C pillars, however, are designed according to the present disclosure to accommodate a ramp or lift, but also to meet all federal safety regulations for vehicle safety as well. Each pillar is modified to maintain sufficient structural integrity required for vehicle safety and crashworthiness standards.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of increasing a width of a door opening of a crossover vehicle to accommodate a wheelchair ramp assembly or lift assembly, the vehicle including a body frame formed partially by at least an A pillar, a B pillar, and a C pillar, where the door opening is defined between the B pillar and the C pillar, the method comprising:
   providing a first template corresponding to the B pillar and a second template corresponding to the C pillar;
   positioning the first template on the B pillar and the second template on the C pillar; marking a first cut line with the first template on the B pillar and a second cut line with the second template on the C pillar;
   cutting along the first cut line with a cutting tool to remove a portion of the B pillar;
   cutting along the second cut line with the cutting tool to remove a portion of the C pillar;
   assembling a B pillar cover assembly;
   coupling a reinforcement plate to a remaining portion of the C pillar;
   applying an adhesive to the B pillar cover assembly and to a C pillar cap; and
   producing a modified B pillar by coupling the B pillar cover assembly to a remaining portion of the B pillar;
   producing a modified C pillar by coupling the C pillar cap to the reinforcement plate and the remaining portion of the C pillar; and
   wherein, increasing the width of the door opening between the B pillar and C pillar to enables the crossover vehicle to accommodate the wheelchair ramp assembly or lift assembly.

2. The method of claim 1, further comprising:
   providing a plurality of members; and
   coupling the plurality of members to form the B pillar cover assembly.

3. The method of claim 2, wherein the coupling the plurality of members step comprises slidably engaging a tab on a first member of the plurality of members with a sleeve on a second member of the plurality of members.

4. The method of claim 2, wherein the coupling the plurality of members step comprises positioning each of the plurality of members in contact with the remaining portion of the B pillar so that a protruding body formed on an inner surface of each member abuts an inner surface of the remaining portion of the B pillar.

5. The method of claim 2, wherein the coupling the plurality of members step comprises a tongue-and-groove connection.

6. The method of claim 1, further comprising:
   drilling and tapping a plurality of holes in the B pillar cover assembly; and
   fastening the B pillar cover assembly to the remaining portion of the B pillar via fasteners.

7. The method of claim 1, further comprising assembling a body to the B pillar cover assembly, the body including a cavity or through-hole configured to receive a door.

8. The method of claim 1, wherein the increasing the width of the door opening comprises increasing the width by at least three inches.

9. The method of claim 1, further comprising:
   clamping the B pillar cover assembly to the remaining portion of the B pillar;
   triggering a waiting period; and allowing the adhesive to dry between the B pillar cover assembly and the remaining portion of the B pillar until the waiting period expires.

10. The method of claim 1, wherein the coupling a reinforcement plate comprises tack welding the reinforcement plate to the remaining portion of the C pillar.

11. The method of claim 1, further comprising:
aligning a planar surface of the C pillar cap with a planar surface of the reinforcement plate or the remaining portion of the C pillar; and
aligning a curved surface of the C pillar cap with a curved surface of the remaining portion of the C pillar.

\* \* \* \* \*